(12) United States Patent
Jonasson

(10) Patent No.: US 11,001,745 B2
(45) Date of Patent: May 11, 2021

(54) HYDROCARBON RECOVERY COMPOSITION, METHOD, AND SYSTEM

(71) Applicant: THE SASKATCHEWAN RESEARCH COUNCIL, Saskatoon (CA)

(72) Inventor: Ralph George Jonasson, Regina (CA)

(73) Assignee: The Saskatchewan Research Council, Saskatoon (CA)

( * ) Notice: Subject to any disclaimer, the term of this patent is extended or adjusted under 35 U.S.C. 154(b) by 16 days.

(21) Appl. No.: 16/316,877

(22) PCT Filed: Jul. 7, 2017

(86) PCT No.: PCT/CA2017/050827
§ 371 (c)(1),
(2) Date: Jan. 10, 2019

(87) PCT Pub. No.: WO2018/010017
PCT Pub. Date: Jan. 18, 2018

(65) Prior Publication Data
US 2019/0292437 A1 Sep. 26, 2019

Related U.S. Application Data

(60) Provisional application No. 62/360,647, filed on Jul. 11, 2016.

(51) Int. Cl.
*C09K 8/584* (2006.01)
*C09K 8/592* (2006.01)
(Continued)

(52) U.S. Cl.
CPC .............. *C09K 8/584* (2013.01); *C09K 8/592* (2013.01); *E21B 43/2406* (2013.01); *E21B 43/34* (2013.01)

(58) Field of Classification Search
CPC ........ E21B 43/16; E21B 43/26; E21B 43/267; E21B 21/00; E21B 37/06; E21B 41/02; E21B 43/20
See application file for complete search history.

(56) References Cited

U.S. PATENT DOCUMENTS

| 4,458,759 A | 7/1984 | Isaacs et al. |
| 4,514,310 A | 4/1985 | Heilweil |

(Continued)

FOREIGN PATENT DOCUMENTS

| CA | 2754359 A1 | 8/2010 |
| WO | WO-03/025340 A1 | 3/2003 |

OTHER PUBLICATIONS

International Search Report and Written Opinion for International Application No. PCT/CA2017/050827, dated Oct. 12, 2017 (9 pages).

(Continued)

*Primary Examiner* — Zakiya W Bates
(74) *Attorney, Agent, or Firm* — Clark & Elbing LLP

(57) ABSTRACT

Compounds, systems and method(s) for removing hydrocarbons from a hydrocarbon-containing reservoir. Various N-alkyl-2-pyrrolidones, such as N-octyl-2-pyrrolidone, alone in hot water or steam, or in conjunction with other surfactants and/or solvents are injected into petroleum reservoirs containing heavy oil or bitumen to accomplish one or more functions: (1) increase rate of petroleum production compared to that produced using steam and/or hot water alone; (2) decrease steam to oil ratio; (3) extend life of a well by recovering more petroleum; (4) recover petroleum from wells that have been declared uneconomic using existing recovery methods; and/or (5) generally increase estimated petroleum reserves by reducing cost of production. The N-alkyl-2-pyrrolidones are most usefully applied in cyclic steam stimulation, steam drive or steam assisted gravity (Continued)

drainage operations after the initial rate of petroleum production has begun to decline. N-alkyl-2-pyrrolidones have additional advantages in thermal EOR in being resistant to thermal decomposition in water.

22 Claims, 23 Drawing Sheets

(51) Int. Cl.
    *E21B 43/24* (2006.01)
    *E21B 43/34* (2006.01)
    *E21B 43/22* (2006.01)

(56) References Cited

U.S. PATENT DOCUMENTS

| | | | |
|---|---|---|---|
| 5,042,583 A | 8/1991 | D'Souza et al. | |
| 5,634,984 A * | 6/1997 | Van Slyke | B09C 1/025 |
| | | | 134/26 |
| 2002/0023752 A1 * | 2/2002 | Qu | E21B 43/26 |
| | | | 166/308.1 |
| 2004/0030024 A1 * | 2/2004 | Rosen | C08J 7/065 |
| | | | 524/487 |
| 2006/0258541 A1 | 11/2006 | Crews | |
| 2016/0122626 A1 * | 5/2016 | Dwarakanath | C09K 8/584 |
| | | | 166/270.1 |
| 2017/0226836 A1 | 8/2017 | Sanders et al. | |

OTHER PUBLICATIONS

International Preliminary Report on Patentability for International Application No. PCT/CA2017/050827, dated Oct. 2, 2018 (18 pages).
Gomez et al., "Fracturing With Viscoelastic Surfactant Fluid in Cyclic Steam Injection Wells—A Synergy for Heavy Oil Recovery," Society of Petroleum Engineers. 153536: 1-7 (2012).
Negin et al., "Most Common Surfactants Employed in Chemical Enhanced Oil Recovery," Petroleum. 3(2): 197-211 (2017).
Oilfield Surfactants Market, Industry ARC, Oct. 24, 2020 (231 pages).
Oilfield Surfactants Market, ME Data Tables, Oct. 24, 2020 (8 pages).
Sheng., "Status of Surfactant EOR Technology," Petroleum. 1: 97-105 (2015).
Van Santvoort et al., "Improved Oil Reservoir Sweep with Viscoelastic Surfactants," Energy & Fuels, ACS Publications. 30(11): 9226-9232 (2016).
Yarveicy et al., "Enhancing Oil Recovery by Adding Surfactants in Fracturing Water: A Montney Case Study," SPE Canada Unconventional Resources Conference, Society of Petroleum Engineers. 1-13 (2018).

* cited by examiner

Bitumen recovered from native bitumen ore using NOP in the liquid and gas phases at 200°C.

Bitumen recovered from native bitumen ore using NOP in the liquid and gas phases at 243°C.

Tests 4 and 9, synthetic brine control.

Tests 4 and 9, after shaking.

After 6 days neither sample has changed in appearance.

Test 2 and 7, with ODAN. The insoluble surfactant mixture is visible as a light amber oil at the surface of the brine.

Tests 2 and 7, after shaking.

After six days, a small amount of light amber oil is visible at the water surface.

Tests 5 and 10, with alkylbenezene sulfonate.

Tests 5 and 10, with alkylbenezene sulfonate, after shaking.

After 6 days, a pale sludge is present at the water surface.

Tests 1 and 6, Ethoduomeen + NOP (2 days).

Tests 1 and 6, after shaking. Three black specks are visible in the foam in vial #1.

After 6 days more heavy oil was released (black droplets).

Tests 3 and 8, with Ethomeen + NOP.

Tests 3 and 8, after shaking. A black speck is visible in the foam in vial #8.

After 6 days the droplets of heavy oil are noticeably larger in both cases.

Appearance of brine after decanting from autoclaves. Note that samples 3 and 4 were clear and colorless, suggesting little or no emulsification. Essentially all the free petroleum was retained on the walls of the Teflon liner. A few tiny droplets of petroleum are visible at the air/water/glass interface in beaker #3.

Appearance of brine with a focus on the pellets following the autoclave test.
The pellets were recovered whole in all four tests.

Appearance of methylene chloride extracts of Teflon liners. Note that Ethoduomeen extracted very little petroleum from the Teflon liner containing a hot-aged pellet (#2).

Oil recovery curves from small vertical coreflood tests on Athabasca oil sand.

Recoveries of bitumen from reconstituted oil sand using various chemicals in the gas phase at 240°C.

HYDROCARBON RECOVERY COMPOSITION, METHOD, AND SYSTEM

CROSS REFERENCE TO RELATED APPLICATION

This application claims priority to U.S. 62/360,647, filed Jul. 11, 2016, the entire contents of which is hereby incorporated by reference.

FIELD

The present disclosure relates generally to compound(s), composition(s), systems and method(s), for removing hydrocarbons from a hydrocarbon-containing reservoir.

BACKGROUND

Canada has the third largest oil reserves in the world, with 97% of Canada's oil reserves in the oil sands. Oil sands are a mixture of sand, water, clay and bitumen. Bitumen is a hydrocarbon that is too heavy or thick to flow or be pumped without being diluted, heated, or both. About 80% of the oil sands in Canada are present in subterranean reservoirs, accessible by in situ mining, with about 20% of the oil sand accessible by open-pit mining.

In the recovery of hydrocarbons from subterranean reserves, it is only possible to obtain a portion of the hydrocarbons from the reserve using existing techniques. It would be desirable to increase amount of hydrocarbons from reserves.

It is, therefore, desirable to provide a hydrocarbon recovery compound, composition, method and/or system.

SUMMARY

In one aspect, the present disclosure provides a hydrocarbon recovery composition comprising an N-alkyl-2-pyrrolidone surfactant.

In a specific example, said N-alkyl-2-pyrrilidone is

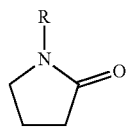

(I)

wherein R is a $C_4$-$C_{30}$ alkyl.

In a specific example, said N-alkyl-2-pyrrilidone is 1-octyl-2-pyrrilidone, N-methyl-2-pyrrolidone, N-cyclohexyl-2-pyrrolidone, or N-dodecyl-2-pyrrolidone.

In a specific example, said 1-octyl-2-pyrrilidone, N-methyl-2-pyrrolidone, N-cyclohexyl-2-pyrrolidone, or N-dodecyl-2-pyrrolidone, is a liquid, a gas, or a solid.

In a specific example, further comprising a second surfactant, or a co-solvent.

In a specific example, wherein the ratio of N-alkyl-2-pyrrolidone to second surfactant is between about 1:99 (wt/wt) to about 99:1 (wt/wt), preferably about 1:1 (wt/wt).

In a specific example, said second is an alkoxylated amine.

In a specific example, said co-solvent comprises a fluid selected from methane, ethane, propane, butane, other alkane generally use in EORs, isopropyl alcohol, 2-butanol, or lower molecular weight alkoxylated alcohols, or chemical conventionally used in the preparation of commercial surfactant formulation.

In a specific example, said second surfactant comprises, Ethomeen, Ethoduomeen, or Propomeen.

In a specific example, said second surfactant comprises Ethoduomeen T/13, Ethoduomeen T/20, Ethoduomeen T/25; Ethomeen C/12, Ethomeen C/15, Ethomeen C/20, Ethomeen 0/12, Ethomeen 0/15, Ethomeen T/12, Ethomeen T/15, Ethomeen S/12, Ethomeen S/15, Ethomeen S/20, Ethomeen 18/12, Ethomeen 18/15, Ethomeen 18/20, Ethomeen C/25, Ethomeen T/25, Ethomeen S/25, Ethomeen 18/25, Propomeen C/12, Propomeen O/12, or Propomeen 17/12.

In a specific example, said second surfactant is Ethomeen 18/25.

In a specific example, said Ethoduomeen is Ethoduomeen T/13, T/20, or T/25

In a specific example, said second surfactant is Ethoduomeen T/25.

In another aspect there is provided a method of recovering a hydrocarbon from a hydrocarbon containing reservoir, comprising:
a) providing a hydrocarbon recovery composition according to any one of claims 1 to 13 to a hydrocarbon containing reservoir;
b) extracting a portion of said hydrocarbons within said hydrocarbon containing reservoir; and
c) removing said extracted portion of said hydrocarbons from said hydrocarbon containing reservoir.

In a specific example, said providing of said hydrocarbon recovery composition comprises providing said hydrocarbon recovery composition in a recovery process, wherein said hydrocarbon recover composition is dissolved in a heated fluid.

In a specific example, said heated fluid is a heated liquid or a heated gas.

In a specific example, recovery process comprises cyclic steam stimulation, steam assisted gravity drainage, vapour extraction, steam flooding, or enhanced oil recovery.

In a specific example, said extracting comprises contacting said hydrocarbon recovery composition with said hydrocarbon containing reservoir for a time sufficient to extract said portion of said hydrocarbons.

In a specific example, said time sufficient to extract said portion of said hydrocarbon is less than seven day, is about seven days, is more than seven days.

In a specific example, said removing of said extracted portion of said hydrocarbons comprises pumping said extracted hydrocarbons from said hydrocarbon reservoir.

In a specific example, further comprising removing said hydrocarbon recovery composition from said removed portion of said extracted hydrocarbons.

In another aspect there is provided a system for recovering a hydrocarbon from a hydrocarbon containing reservoir, comprising:
a) a well system for a heated-fluid method of recovering said hydrocarbons from said hydrocarbon containing reservoir; and
b) a hydrocarbon recovery composition according to any one of claims 1 to 14.

In a specific example, said hydrocarbon recovery composition is injected in said well system with a heated fluid.

In a specific example, said heated fluid is a heated liquid or a heated gas.

In a specific example, said well system comprises cyclic steam stimulation, steam assisted gravity drainage, vapour extraction, steam flooding, or enhanced oil recovery.

In a specific example, said well system further comprises a removing system for removing said extracted portion of said hydrocarbons extracted hydrocarbons.

In a specific example, said removing system comprises a pump.

In a specific example, further comprising a separator for removing said removing said hydrocarbon recovery composition from said removed portion of said hydrocarbon reservoir.

In another aspect there is provide an injectable liquid comprising a hydrocarbon recovery composition according to any one of claims 1 to 12 in heated fluid.

In a specific example, said heated fluid is a heated liquid or a heated gas.

In a specific example, said heated liquid is water or brine.

In a specific example, said heated gas is steam.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
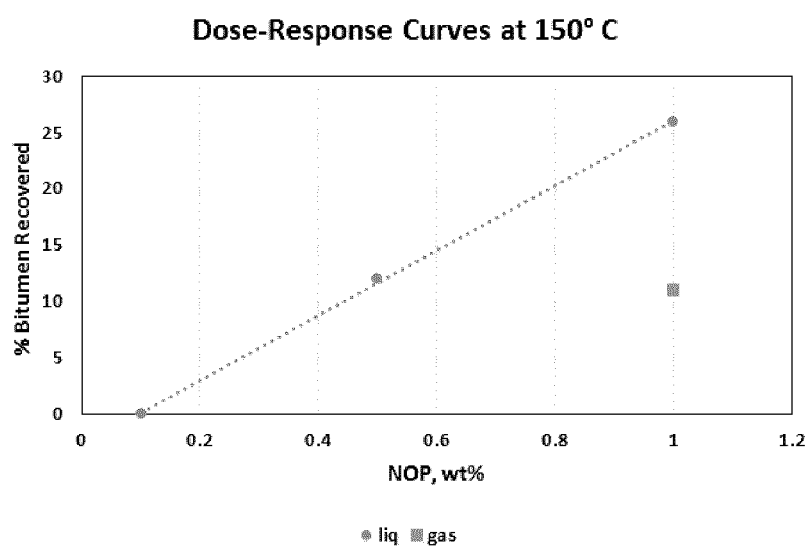
FIG. 1 depicts dose response curves of NOP at 150° C.

Generally, the present disclosure provides compound(s), composition(s), and method(s), and/or system(s), for removing hydrocarbons from a hydrocarbon-containing reservoir(s).

Described herein are a hydrocarbon recovery compound, composition, method, and system. The hydrocarbon recovery compound, composition, method, and system, are for use in recovery of hydrocarbons from a hydrocarbon containing reservoir, and/or reserve which may contain hydrocarbons, and/or sample from a hydrocarbon containing reservoir or a reserve which may contain hydrocarbons.

In some examples, such compounds, compositions, method and systems generally involve either surfactants, in the traditional sense, or steam additives. In some examples, as discussed herein, the compounds described herein fall between the general categories of surfactant and steam additive, in terms of boiling point, interfacial tension and/or molecular weight.

Various N-alkyl-2-pyrrolidones, such as N-octyl-2-pyrrolidone have been used commercially as surface-active agents and/or solvents in cleanser formulations, paint strippers and other applications.

In the present application, generally, in some examples, one or more N-alkyl-2-pyrrolidones, alone or in a fluid including but not limited to hot water or steam, or in conjunction with other surfactants and/or solvents are injected into petroleum reservoirs containing heavy oil or bitumen.

In some examples, in use, one or more of the following is accomplished: (1) increase the rate of petroleum production compared to that produced using steam and/or hot water alone; (2) decrease the steam to oil ratio, to improve energy efficiency; (3) to extend the life of a well by recovering more petroleum; (4) to recover petroleum from wells that had been declared uneconomic using existing recovery methods; or (5) generally increase the estimated petroleum reserves, by reducing the cost of production.

In some examples, the N-alkyl-2-pyrrolidones are most usefully applied in cyclic steam stimulation, steam drive or steam assisted gravity drainage operations after the initial rate of petroleum production has begun to decline.

Those skilled in the art will appreciate that petroleum recovery typically decreases significantly once water channels are formed between injection and production sites (water break-through). While not wishing to be bound by theory, the N-alkyl-2-pyrrolidones are intended to improve sweep efficiency by (1) altering the wettability of the host rock surfaces, (2) altering the viscosity of petroleum and/or water/petroleum emulsions, and/or (3) helping to transport petroleum to the surface by emulsifying it with water.

Hydrocarbons generally refer to molecules formed primarily of carbon and hydrogen atoms and include, but are not limited to, oil, crude oil, heavy oil (including both heavy oil and extra heavy oil), bitumen, and petroleum. Hydrocarbons may also include other elements, such as halogens, oxygen, nitrogen, metallic elements, and/or sulfur. Hydrocarbons derived from a hydrocarbon containing reservoir may also include asphaltenes, kerogen, pyrobitumen, and/or combinations thereof. Hydrocarbons may be located within a mineral matrix of the hydrocarbon containing reservoir, or adjacent to mineral matrices within the reservoir. Mineral matrices containing hydrocarbons may include, but are not limited to sands, carbonate sand, quartz sand, porous carbonate rock, sedimentary rock, silicate minerals, carbonates, diatomites and other porous media.

The term recovery as used in hydrocarbon recovery also encompasses extraction. For example, in situ extraction of bitumen involves extracting bitumen from sand in a subterranean reservoir or location. In another example, hydrocarbon recovery is from a non-subterranean reservoir or location, such as an open pit.

Hydrocarbon reservoir may be subterranean or may be found at the surface. In a specific example the reservoir is a subterranean.

The term "subterranean reservoir" as used herein refers to a volume of material that may be at least partly underground and contains a mixture of unwanted materials and the hydrocarbon. Subterranean reservoirs include, but are not limited to, one or more hydrocarbon containing layers, one or more non-hydrocarbon containing layers, an overburden, and/or an underburden. In some cases, the subterranean reservoir does not have an overburden or very thin overburden, for example, where a geological formation is exposed at the surface of the earth.

Hydrocarbons contained within the hydrocarbon containing reservoir, for example in a subterranean reservoir, may be obtained by drilling. The term "drilling" as used herein refers to both vertical and non-vertical drilling and boring techniques, and includes vertical drilling, directional drilling or slant drilling, and directional boring or horizontal directional drilling.

In some examples, the hydrocarbon containing reservoir, or portion thereof, is present at about less than 1000 feet below the surface. In some examples, the hydrocarbon containing reservoir, or portion thereof, is present at about more than 1000 feet below the surface.

The properties of the hydrocarbon containing reservoir will affect the removal of the hydrocarbon within the reservoir, the properties including, but are not limited to, porosity, permeability, pore size distribution, surface area, salinity or temperature of formation. Also, the overburden and/or underburden properties in combination with hydrocarbon properties, such as, capillary pressure characteristics and relative permeability characteristics may affect mobilization of hydrocarbons.

A variety of methods are used in recovery of hydrocarbons from hydrocarbon containing reservoirs.

In recovering hydrocarbons from hydrocarbon reservoirs, the goal is generally to reduce the viscosity of the heavy oil or bitumen so that the hydrocarbon may be delivered to the surface. The drive for this surface delivery usually comes from pressure in the formation, or using pumps, or both.

For example, hydrocarbons are typically removed using a well system penetrating the hydrocarbon formation, using fluids such as steam and/or solvent.

The hydrocarbon recovery composition as described herein is used in conjunction with methods used in the recovery of hydrocarbons from hydrocarbon reservoirs including, but not limited to, cyclic steam stimulation (CSS), steam assisted gravity drainage (SAGD) and vapor extraction process (VAPEX), steam flooding, and Enhanced Oil Recovery methods (EOR), generally.

In VAPEX, hydrocarbon solvents are injected into a first horizontal well that extends into subterranean reservoir. The solvents penetrate into the reservoir (oil sands), reduce the viscosity of bitumen by dilution and enable the bitumen/solvent mixture to drain into a second horizontal well below the first from which recovery of the bitumen/solvent mixture occurs.

In CSS (also referred to as a "huff and puff" process), steam, at a temperature in the range of about 250° C.-400° C. is injected down a first well in to a subterranean reservoir, typically at a pressure above the fracture pressure. The well sits for a "soak period" (days to weeks) during which time the viscosity of the hydrocarbon is reduced causing bitumen to drain into the well and after which hot oil mixed with condensed steam is pumped out from the well. Then the process is repeated. In this process, an expanding hydrocarbon depleted zone is developed. Newly injected steam, together with steam already present, moves through the depleted zone to its boundary, to supply heat to the old oil at the boundary.

In SAGD, two horizontal wells are drilled, one below the other (generally approximately five meters apart). Steam is injected into the upper well, heating bitumen in the surrounding subterranean environment thereby lowering the viscosity of the bitumen causing it to flow into the lower well. The resulting bitumen and condensed steam mixture is subsequently pumped to the surface from the bottom well.

A modified version of the SAGD is known as the expanding solvent steam assisted gravity drainage (ES-SAGD) process. The ES-SAGD process requires combining hydrocarbons with steam in a SAGD-type process so the hydrocarbons can solubilize bitumen in subterranean oil sands to further reduce bitumen viscosity to facilitate the drainage of bitumen into a second well hole for recovery to above ground.

In steam flooding, steam is injected through an injection well to thermally drive the hydrocarbons to the producing well. The steam combines with the hydrocarbons to lower the viscosity and mobilize the hydrocarbons to lower the viscosity and mobilize the hydrocarbons. The mobilized hydrocarbons are driven by steam to the producing well.

Other methods included enhanced oil recovery (EOR) methods. EOR methods may include, but are not limited to thermal EOR, miscible displacement EOR, and chemical EOR.

In thermal EOR, oil in a formation is heated to reduce the viscosity of the oil in the formation thereby mobilizing the oil for recovery. Examples of thermal EOR include steam flooding and fire flooding In miscible displacement EOR, a compound or mixture is injected into a oil-bearing formation, which compound or mixture is miscible with oil in the formation, so as to mix with the oil and reduce the viscosity of the oil, lowering its surface tension (and swelling the oil) for mobilizing the oil and for recovery. Typical compounds for use as miscible displacement EOR agents are gases such as $CO_2$ or a hydrocarbon gas such as methane.

In chemical EOR, long-chained polymers, such as polyacrylamides, may be used to increase the effectiveness of waterfloods, or surfactants have been used. N-dodecyl-2-pyrrolidone is particularly well suited for light and tight petroleum reservoirs.

As described herein, there is provided a compound, composition, method and system, which increase the recovery of hydrocarbons from hydrocarbon containing reservoirs, and may be used in conjunction with conventions methods, including by not limited to CSS, SAGD, VAPEX, steam flooding, and/or EOR. While not wishing to be bound by theory, it is believed the compounds and compositions described herein reduce the interfacial tension between the oil and aqueous phases, and/or interfacial tension between the oil and the mineral surfaces in the hydrocarbon reservoir, and facilitate removal of hydrocarbons form the reservoir.

In some examples, the compound(s) and composition(s) herein are surfactants, or volatile alkaline compounds, such as low molecular weight amines. Again, while not wishing to be bound by theory, it is believed these alkaline compounds extract organic acids that naturally occur (to varying degrees) in petroleum, thereby rendering them anionic so that they act as surfactants.

Surfactant generally refers to a substance that reduces surface tension of a liquid, or reduces interfacial tension between two liquids, or reduces interfacial tension between a liquid and a solid, or facilitates the dispersion of an organic material into an aqueous solution.

It has been surprisingly found that the hydrocarbon recovery compounds and compositions and methods and systems described herein may be used to improve hydrocarbon recovery from a hydrocarbon containing reservoir, or a sample from a hydrocarbon containing reservoir.

Improved hydrocarbon recovery may be measured in various ways, including, but not limited to, increased recovery in barrels per day; incremental increase in barrels per day; steam to oil ratio; percent of original oil in place at time of well abandonment; overall oil production over the life of the well; and/or water/oil ratios as a measure of efficiency.

In some example, the hydrocarbon recovery compounds and compositions and methods and systems improve hydrocarbon recovery as compared to a control, such as a negative control.

In one example, the hydrocarbon recovery composition comprises a surfactant. In a specific example, the surfactant is an N-alkyl-lactam or N-alkyl-lactam derivative.

The chemical and solvent properties of these N-alkyl-lactam and/or N-alkyl-lactam derivatives are those of other simple amides, such as dimethylformamide (DMF). That is, they are miscible with many solvents, but generally not paraffins. They have good solvent properties for resins and polymers, and several including N-methyl-2-pyrrolidone (NMP), are used for stripping paint and lacquer. They are fairly stable chemically, except at extreme pH's. Aqueous solutions of many amides have a neutral pH.

More specifically, the N-alkyl-lactam is an N-alkyl-2-pyrrolidone. N-alkyl-2-pyrrolidones are thermally stable, chemically largely inert, colorless, low-viscosity and aprotic solvents.

In a specific example, the N-alkyl-2-pyrrolidone is of the following Formula (I):

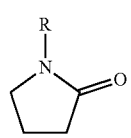

(I)

R may be a linear alkyl, branched alkyl, or cycloalkyl group.

The term "alkyl", as used herein, refers to a straight or branched hydrocarbon group. In some embodiments, alkyl has about 1 to about 60 carbons, about 1 to about 40 carbons, about 1 about 30 carbons, about 1 to about 20 carbons, about 1 to about 10 carbons, about 1 to about 8 carbons, or about 1 to about 6 carbons. Non limiting examples of branched or unbranched $C_1$-$C_8$ alkyl groups include, for example, methyl, ethyl, propyl, isopropyl, butyl, isobutyl, tert-butyl, The term "hydrocarbon" as used herein, refers to a linear, branched or cyclic organic moiety comprising carbon and hydrogen, for example, alkyl, alkene, alkyne, and aryl, which may each be optionally substituted. A hydrocarbon may, for example, comprise about 1 to about 60 carbons, about 1 to about 40 carbons, about 1 about 30 carbons, about 1 about 20 carbons, about 1 to about 10 carbons, about 1 to about 9 carbons, about 1 to about 8 carbons, about 1 to about 6 carbons, about 1 to about 5 carbons, about 1 to about 4 carbons, or about 1 to about 3 carbons. In some embodiments, hydrocarbon comprises 10 carbons, 9 carbons, 8 carbons, 7 carbons, 6 carbons, 5 carbons, 4 carbons, 3 carbons, 2 carbons, or 1 carbon.

The term "heteroaryl", as used herein, refers to a radical derived from an aromatic carbocyclic moiety of up to 60 ring atoms, comprising carbon atom ring atoms and one or more heteroatom ring atoms. Each heteroatom is independently selected from nitrogen, which can be oxidized (e.g., N(O)) or quaternized; oxygen; and sulfur, including sulfoxide and sulfone. In some embodiments, heteroaryl has up to 40 ring atoms, up to 20 ring atoms, up to 12 ring atoms, up to 10 ring atoms, up to 9 ring atoms, up to 6 ring atoms or up to 5 ring atoms. The heteroaryl group can be a monocyclic or polycyclic heteroaromatic ring system including but not limited to condensed heterocyclic aromatic rings, and condensed carbocyclic and heterocyclic aromatic rings. The point of attachment of a heteroaryl group to another group may be at either a carbon atom or a heteroatom of the heteroaryl group.

The term "cycloalkyl", as used herein, refers to a cyclic alkyl group having at least 3 carbon atoms.

The term "alkoxy" as used herein, refers to the group —O-alkyl, including but not limited, methoxy, ethoxy, n-propyloxy, and iso-propyloxy.

The term "alkenyl", as used herein, refers to a straight or branched chain hydrocarbon having at least 2 carbon atoms, which contains at least one carbon-carbon double bond. In some embodiments, alkenyl has about 2 to about 60 carbons, about 2 to about 40 carbons, about 2 about 30 carbons, about 2 to about 8 carbons. In some embodiments, alkenyl has 2 to 8 carbon atoms.

The term "haloalkyl", as used herein, refers to alkyl as defined herein in which one or more hydrogen has been replaced with same or different halogen.

The term "alkynyl", as used herein, refers to a straight or branched chain hydrocarbon having at least 2 carbon atoms, which contains at least one carbon-carbon triple bond. In some embodiments, alkynyl has about 2 to about 60 carbons, about 2 to about 40 carbons, about 2 about 30 carbons, about 2 to about 8 carbons.

The term "alkenylene", as used herein, refers to a divalent form of an alkenyl group.

The term "alkynylene", as used herein, refers to a divalent form of an alkynyl group.

The term "cycloalkylene", as used herein, refers to a divalent form of a cycloalkyl group.

The term "alkoxyalkyl", as used herein, refers to a moiety of the formula —R'—R", where R' is alkylene and R" is alkoxy.

The term "alkylcarbonyl", as used herein, refers to a moiety of the formula —C(O)—R, where R is alkyl.

The term "alkoxycarbonyl", as used herein, refers to a moiety of formula —C(O)—R wherein R is alkoxy.

The term "substituted" as used herein refers to one or more hydrogen atoms have been replaced with a substituent. A skilled person will be able to select a suitable type, number and position of substituents for a desired compound, function and application. Substituents include, but are not limited to, groups selected from alkyl, alkenyl, alkynyl, alkoxy, acyloxy, alkoxyalkyl, alkylamino, alkanoyl, alkylcarbonyl, alkylsulfonyl, alkylsulfinyl, alkylsulfonyloxy, alkylsulfanyl, alkylsulfonamido, alkoxycarbonyl, alkylenedioxy, amino, amido, aminosulfonyl, aralkyl, aryloxy, alkylthio, aryl, arylthio, benzyloxy, carboxy, carbonyl, carbamoyl, cycloalkyl, cycloalkylalkyl, cycloalkoxy, cycloalkylalkoxy, cyano, ester, hydrogen, halo, haloalkyl (e.g. fluorocarbon, trifluoromethyl), haloalkoxy (e.g. trifluoromethoxy), heteroaryl, heteroalkyl, hydroxy, hydroxyalkyl, mercapto, nitro, thiol, thioyl, among others. Substituents themselves can also be optionally substituted.

The term "aryloxy", as used herein, refers to the group —O-aryl, wherein the aryl group is as defined above. The term "heteroaryloxy", used alone or in combination, means the group —O-heteroaryl, wherein the heteroaryl group is as defined above.

The term "arylene", as used herein, refers to a divalent form of an aryl.

The term "heteroarylene", as used herein, refers to a divalent form of a heteroaryl radical.

The term "aryloxy", as used herein, refers to the group —O-arylene.

The term "heteroaryloxy", as used herein, refers to the group —O-heteroarylene.

The term "biarylene", as used herein, refers to a bidentate group comprising two aryl groups attached together by a single bond, and having a point of attachment on each aryl group.

The term "heterobiarylene", as used herein, refers to a bidentate group comprising two heteroaryl groups attached together by a single bond, and having a point of attachment on each heteroaryl group.

The term "biaryloxy" as used herein refers to a bidentate group comprising two aryloxy groups attached together by a single bond, and having a point of attachment on the oxygen atom of each aryloxy group.

The term "heterobiaryloxy", as used herein, refers to a bidentate group comprising two heteroaryloxy groups attached together by a single bond, and having a point of attachment on the oxygen atom of each heteroaryloxy group.

The term "heteroaryl", as used herein, refers to a radical derived from an aromatic carbocyclic moiety of up to 60 ring atoms, comprising carbon atom ring atoms and one or more heteroatom ring atoms. Each heteroatom is independently selected from nitrogen, which can be oxidized (e.g., N(O)) or quaternized; oxygen; and sulfur, including sulfoxide and sulfone. In some embodiments, heteroaryl has up to 40 ring atoms, up to 20 ring atoms, up to 12 ring atoms, up to 10 ring atoms, up to 9 ring atoms, up to 6 ring atoms or up to 5 ring atoms. The heteroaryl group can be a monocyclic or polycyclic heteroaromatic ring system including but not limited to condensed heterocyclic aromatic rings, and condensed carbocyclic and heterocyclic aromatic rings. The point of attachment of a heteroaryl group to another group may be at either a carbon atom or a heteroatom of the heteroaryl group.

The term "amino", as used herein, refers to —NRR' where R and R' are independently hydrogen or alkyl as defined herein.

N-alkyl-2-pyrrolidone molecule possesses both a non-polar chain and a hydrophilic head group. Thus, N-alkyl-2-pyrrolidone molecules have the apparent structure of a surfactant. The lactam ring, which includes a substituted nitrogen atom next to a carbonyl function group, further connected by a chain of carbon atoms of 3, 4, 5, or 6, etc., in number. The amide bond, namely —NR—(C=O)— in the lactam ring is relatively polar and hydrophilic. This provides the hydrophilic end of the surfactant molecule. Attached to the nitrogen atom is an alkyl chain, that is hydrophobic, and provides the hydrophobic end of the molecule.

In some examples, the N-alkyl-2-pyrrolidone is a $C_4$-$C_{30}$ N-alkyl-2-pyrrolidone.

In a specific example, the N-alkyl-2-pyrridolidone is N-octyl-2-pyrrolidone (also referred to as 1-octyl-2-pyrrolidone, or NOP).

In another specific example, the N-alkyl-2-pyrridolidone is N-methyl-2-pyrrolidone.

In another specific example, the N-alkyl-2-pyrridolidone is N-cyclohexyl-2-pyrrolidone.

In another specific example, the N-alkyl-2-pyrridolidone is N-dodecyl-2-pyrrolidone.

NOP has a solubility in water at room temperature of about 1 g/L; a boiling point at atmospheric pressure of about 305° C. NOP was shown to be stable for at least one week at 200° C.

NOP at concentrations between 1000 ppm and 10,000 ppm was found herein to release more free (that is, not emulsified) bitumen or heavy oil from mineral matrices, including carbonate sand, porous carbonate rock and quartz sand. In a specific example, NOP was tested at temperatures between 150° C. and 240° C. In some examples, NOP is used under conditions of temperature, and pressure, including those found in CCS, SAGD, steam flooding, and/or EOR, operations.

In use, in some examples, N-alkyl-2-pyrrolidone is of the following Formula (I):

(I)

as defined above and herein, for example, is used at a concentration of about 100 ppm to about 10,000 ppm. In some examples, the N-alkyl-2-pyrrollidone is used at a concentration of about 100 ppm, about 200 ppm, about 300 ppm, about 400 ppm, about 500 ppm, about 600 ppm, about 700 ppm, about 800 ppm, about 900 ppm, about 1000 ppm, about 2000 ppm, about 3000 ppm, about 4000 ppm, about 5000 ppm, about 6000 ppm, about 7000 ppm, about 8000 ppm, about 9000 ppm, about 10000 ppm.

In some examples, the N-alkyl-2-pyrrollidone is used at a concentration of from about 0.01% to about 1%. In another example, NOP is used at about 0.01%, about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.95%, about 1%.

In some examples, in use, the N-alkyl-2-pyrrollidone is provided as a liquid, a gas, a solid, or combinations thereof.

In some examples, the N-alkyl-2-pyrrollidone is used at a temperature of about 150° C., about 200° C., about 243° C., about 300° C., or above about 300° C. In some examples, the N-alkyl-2-pyrrollidone is used at a temperature of about 150° C. to about 300° C. In other example, the N-alkyl-2-pyrrollidone is used at a temperature of less than about 150° C. In another example, the N-alkyl-2-pyrrollidone is used at a temperature greater than about 300° C.

In some examples, in use, the N-alkyl-2-pyrrolidone, or composition comprising N-alkyl-2-pyrrolidone, is provided as a liquid, a gas, a solid, or combinations thereof.

In use, in some examples, NOP is used at a concentration of about 100 ppm to about 10,000 ppm. In some examples, NOP is used at a concentration of about 100 ppm, about 200 ppm, about 300 ppm, about 400 ppm, about 500 ppm, about 600 ppm, about 700 ppm, about 800 ppm, about 900 ppm, about 1000 ppm, about 2000 ppm, about 3000 ppm, about 4000 ppm, about 5000 ppm, about 6000 ppm, about 7000 ppm, about 8000 ppm, about 9000 ppm, about 10000 ppm.

In some examples, NOP is used at a concentration of from about 0.01% to about 1%. In another example, NOP is used at about 0.01%, about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.95%, about 1%.

In some examples, in use, the NOP, or composition comprising NOP, is provided as a liquid, a gas, a solid, or combinations thereof.

In some examples, NOP is used at a temperature of about 150° C., about 200° C., about 243° C., about 300° C., or above about 300° C. In some examples, NOP is used at a temperature of about 150° C. to about 300° C. In other example, NOP is used at a temperature of less than about 150° C. In another example, NOP is used at a temperature greater than about 300° C.

In other examples, N-methyl-2-pyrrolidone, N-cyclohexyl-2-pyrrolidone, or N-dodecyl-2-pyrrolidone, is used under conditions of temperature, and pressure, including those found in CCS, SAGD, steam flooding, and/or EOR, operations.

In some examples, N-methyl-2-pyrrolidone, N-cyclohexyl-2-pyrrolidone, or N-dodecyl-2-pyrrolidone, or composition comprising N-methyl-2-pyrrolidone, N-cyclohexyl-2-pyrrolidone, or N-dodecyl-2-pyrrolidone, is used at a concentration of about 1000 ppm to about 10,000 ppm.

In some examples, N-methyl-2-pyrrolidone, N-cyclohexyl-2-pyrrolidone, or N-dodecyl-2-pyrrolidone, is used at a concentration of about 100 ppm to about 10000 ppm. In some examples, N-methyl-2-pyrrolidone, N-cyclohexyl-2-pyrrolidone, or N-dodecyl-2-pyrrolidone, is used at a concentration of about 100 ppm, about 200 ppm, about 300 ppm, about 400 ppm, about 500 ppm, about 600 ppm, about 700 ppm, about 800 ppm, about 900 ppm, about 1000 ppm, about 2000 ppm, about 3000 ppm, about 4000 ppm, about 5000 ppm, about 6000 ppm, about 7000 ppm, about 8000 ppm, about 9000 ppm, about 10000 ppm.

In some examples, N-methyl-2-pyrrolidone, N-cyclohexyl-2-pyrrolidone, or N-dodecyl-2-pyrrolidone, is used at a concentration of from about 0.001% to about 1%. In another example, N-methyl-2-pyrrolidone, N-cyclohexyl-2-pyrrolidone, or N-dodecyl-2-pyrrolidone, is used at about 0.01%, about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.95%, about 1%.

In some examples, in use, the N-methyl-2-pyrrolidone, N-cyclohexyl-2-pyrrolidone, or N-dodecyl-2-pyrrolidone, or composition comprising N-methyl-2-pyrrolidone, N-cyclohexyl-2-pyrrolidone, or N-dodecyl-2-pyrrolidone is provided as a liquid, a gas, a solid, or combinations thereof.

In some examples, N-methyl-2-pyrrolidone, N-cyclohexyl-2-pyrrolidone, or N-dodecyl-2-pyrrolidone, is used at a temperature of about 150° C., about 200° C., about 243° C., or about 300° C. In some examples, N-methyl-2-pyrrolidone, N-cyclohexyl-2-pyrrolidone, or N-dodecyl-2-pyrrolidone, is used at a temperature of about 150° C. to about 300° C. In other example, N-methyl-2-pyrrolidone, N-cyclohexyl-2-pyrrolidone, or N-dodecyl-2-pyrrolidone, is used at a temperature of less than about 150° C. In another example, N-methyl-2-pyrrolidone, N-cyclohexyl-2-pyrrolidone, or N-dodecyl-2-pyrrolidone, is used at a temperature greater than about 300° C.

In another example, the N-alkyl-2-pyrrolidone selected has properties (as described herein) similar to N-methyl-2-pyrrolidone, N-cyclohexyl-2-pyrrolidone, or N-dodecyl-2-pyrrolidone.

Thus, in one example, desirably, the surfactant comprising a lactam ring (i.e. a lactam derivative) selected has similar physical properties to NOP.

In some examples, the hydrocarbon recovery composition comprising the surfactant is soluble, or sufficiently soluble, in a fluid.

In one example, the fluid is an injection fluid which is aqueous brine. Surfactants or mixtures thereof that are not soluble will form precipitates, and such precipitate will be effectively lost and will not be available for interaction with the hydrocarbon within the hydrocarbon containing reservoir.

In other examples, the fluid is a gas, including but not limited to methane, ethane, propane, butane, or other alkane generally use in EOR.

In other examples, the fluid includes, but is not limited to, isopropyl alcohol, 2-butanol, or lower molecular weight alkoxylated alcohols, or chemical conventionally used in the preparation of commercial surfactant formulation.

In other examples, the N-alkyl-2-pyrrolidone selected has properties (as described herein) similar to N-octyl-2-pyrrolidone.

In use, in one example, the hydrocarbon recover composition is used with the hot water or steam used in recovery of hydrocarbons, and enhances the recovery of heavy oil or bitumen. While not wishing to be bound by theory, it is believed that the hydrocarbon recovery composition reduces the interfacial tension between the oil and aqueous phases, and/or that between the oil and the mineral surfaces in the formation. The hydrocarbon recovery composition is a surfactant, or volatile alkaline compounds, such as low molecular weight amines. Again while not wishing to be bound by theory it is believed the alkaline compounds work by extracting organic acids that naturally occur to varying degrees in petroleum, and rendering them anionic so that they act as surfactants.

NOP has a solubility in water at room temperature of about 1 g/L. It has a boiling point at atmospheric pressure of 305° C. NOP is a colorless mobile liquid with a melting point of −26° C. and a vapor pressure of 0.02 mbar at 55° C. It has a flash point of 142° C. In use, NOP may be delivered as a pure liquid. However, in some instance, it is desirable to add co-solvents and/or co-surfactants to reduce the freezing point of the formulation further, or to enhance the solubility of NOP in water.

The hydrocarbon recovery composition may further comprise at least one additional surfactant. It was found that NOP could be made to function at a lower temperature adding another surfactant. In a specific example, NOP functioned at a temperature of 80° C. by adding another surfactant.

In use, the first surfactant and second surfactant may be combined for use, may be added separately and concurrently, or separately and sequentially.

Accordingly, in the example in which the hydrocarbon recovery comprises an N-alkyl-2-pyrrolidone, N-octyl-pyrrolidone, N-methyl-2-pyrrolidone, N-cyclohexyl-2-pyrrolidone, or N-dodecyl-2-pyrrolidone, and a second surfactant, in use (1) the N-alkyl-2-pyrrolidone, N-octyl-pyrrolidone, N-methyl-2-pyrrolidone, N-cyclohexyl-2-pyrrolidone, or N-dodecyl-2-pyrrolidone and the second surfactant may be combined prior to use, (2) the N-alkyl-2-pyrrolidone, N-octyl-pyrrolidone, N-methyl-2-pyrrolidone, N-cyclohexyl-2-pyrrolidone, or N-dodecyl-2-pyrrolidone and a second surfactant may be added separately, and concurrently, or (3) the N-alkyl-2-pyrrolidone, N-octyl-pyrrolidone, N-methyl-2-pyrrolidone, N-cyclohexyl-2-pyrrolidone, or N-dodecyl-2-pyrrolidone and a second surfactant may be added separately and sequentially.

Accordingly, in the example in which the hydrocarbon recovery composition comprises NOP and a second surfactant, in use (1) NOP and the second surfactant may be combined prior to use, (2) NOP and a second surfactant may be added separately, and concurrently, or (3) NOP and a second surfactant may be added separately and sequentially.

Non-limiting examples of said at least one additional surfactant include alkyl amine ethoxylates generally. In specific examples the at least one additional surfactant is Ethomeen or Ethoduomeen.

Solvents, also referred to as "co-solvents", may be added to hydrocarbon recovery composition in order to improve the water solubility of the surfactant(s).

Examples of co-solvents that may be used include, but are not limited a gas, including but not limited to methane, ethane, propane, butane, or other alkane generally use in EOR.

In other examples, the co-solvent includes, but is not limited to, isopropyl alcohol, 2-butanol, or lower molecular weight alkoxylated alcohols, or chemical conventionally used in the preparation of commercial surfactant formulation.

In some examples, the hydrocarbon recovery composition further comprises an alkoxylated amine. Alkoxylated amines, or similarly derivitized amines, includes amines of various degrees of alkoxylation. Some examples include, but are not limited to Ethomeen, Ethoduomeen, or Propomeen (Akzo Nobel).

More specific examples include, but are not limited to, Ethoduomeen T/13, T/20, and T/25; Ethomeen C/12, C/15, C/20, 0/12, 0/15, T/12, T/15, S/12, S/15, S/20, 18/12, 18/15, 18/20, C/25, T/25, S/25, and 18/25, and Propomeen C/12, O/12, 17/12.

In another specific example, the alkyl alkoxylated amine is Ethoduomeen T/25 or Ethomeen 18/25.

In a specific example, the hydrocarbon recovery composition comprises NOP and Ethoduomeen T/25. In another example, the hydrocarbon recovery composition comprises NOP and Ethomeen 18/25.

In use, the surfactant and alkyl alkoxylated amine may be combined for use, may be added separately and concurrently, or separately and sequentially.

In use, in one example, the solvent is added at a separate stage, so that the pressure and temperature conditions are optimal for solvent injection.

Accordingly, in the example in which the hydrocarbon recovery composition comprises NOP and Ethoduomeen T/25, in use (1) NOP and Ethoduomeen T/25 may be combined prior to use, (2) NOP and Ethoduomeen T/25 may be added separately, and concurrently, or (3) NOP and Ethoduomeen T/25 may be added separately and sequentially.

In a specific example in which NOP and Ethoduomeen T/25 are combined prior to use.

In one example, the hydrocarbon recovery composition comprises a surfactant and an alkyl alkoxylated amine in a ratio of 1:1 (wt/wt). In a specific example, the hydrocarbon recover composition comprises NOP and Ethoduomeen T/25 in an amount of about 1:1 (wt/wt). In a specific example, the hydrocarbon recovery composition comprises NOP and Ethomeen 18/2 in an amount of about 1:1 (wt/wt).

In some examples, in use, the hydrocarbon recovery composition comprises NOP and Ethomeen or Ethoduomeen in a ratio of 1:99 (wt/wt) to 99:1 (wt/wt). In a specific example the hydrocarbon recovery composition comprises NOP and Ethomeen or Ethoduomeen in a ratio of 1:1 (wt/wt).

In use, the aqueous solution of NOP and Ethomeen or Ethoduomeen is fed in to the formation as a water slug between steam injections, or with a treat string to the sand face.

In use, in one example, NOP is added to the steam phase directly when the steam is at or above 300° C.

In one example, it was found that a hydrocarbon recovery composition herein, comprising NOP, functioned by dissolving the heavy oil or bitumen in a sample containing hydrocarbons. This has the effect of reducing the viscosity of the petroleum. In addition, the hydrocarbon recovery composition comprising NOP, had the effect of releasing petroleum from mineral surfaces. This released petroleum then either floats on the water surface, or adheres to Teflon surfaces that were part of the test equipment. The NOP reduces the viscosity of the bitumen, the density of the bitumen, and the wetting of mineral surfaces by bitumen. It has both solvent and surfactant properties.

The experimental data were obtained from several types of material: (1) as-is bitumen in unconsolidated carbonate sand, (2) compressed pellets made from crushed carbonate core and heavy oil, tested at 80° C., (3) compressed pellets made from crushed carbonate core and heavy oil, tested at 200° C. (4) pellets made from bitumen mixed with quartz sand and synthetic brine.

The data were collected using static autoclave vessels (Parr acid digestion vessels with Teflon liners) between about 150° C. and 240° C. The bitumen ore is placed in the vessel with water plus the surfactant being tested. The experiments were carried out using 1000 to 10,000 ppm surfactant, and included control runs with only brine or deionized (DI) water. Typically the autoclaves were placed in an oven for 1 week.

In one modification of this test, instead of submerging the bitumen ore sample below the water line, the samples were suspended in the gas-filled head space of the vessel using Nichrome wire. This test determined that the volatile surfactant functioned in the gas phase.

After the vessels had cooled they were opened and photographed. The goal was to determine the release the bitumen or heavy oil from the mineral matrix, and have it move to the surface of the water or to the surface of the Teflon liner. To measure the release of petroleum quantitatively, the Teflon liners were drained and the remaining ore was removed. It was found that the free petroleum frequently would adhere to the Teflon liner.

This petroleum was recovered from the Teflon liner by extracting with a solvent with a low boiling point. The methylene chloride solution would then be transferred to pre-weighed weighing boats and placed in a fume hood to allow the methylene chloride to evaporate. The methylene chloride solutions were photographed as a quality control check. Once the solvent had evaporated the remaining petroleum would be weighed. The recovery of petroleum was reported in two ways: as a percentage of the original ore specimen, and as a percentage of the petroleum originally present. This latter method was less accurate since it required using an average original petroleum contents of the as-is ore, re-saturated core, pellets and bitumen/sand mixtures.

In general, tests with NOP released more petroleum than did other surfactants, or did the controls.

NOP at concentrations between 1000 and 10,000 ppm was found to release more free (that is, not emulsified) bitumen or heavy oil from mineral matrices, including carbonate sand, porous carbonate rock and quartz sand.

NOP has additional physical and chemical properties that make it suitable for thermal EOR, namely, it is volatile and can be distilled without decomposition; it is partly soluble in water; it is partly soluble in petroleum. In dissolving in bitumen, it has the effect of reducing its viscosity.

Based on laboratory experiments described herein, while not wishing to be bound by theory, it appears that NOP functions by dissolving the heavy oil or bitumen. This has the effect of reducing the viscosity of the petroleum. In addition, the NOP has the effect of releasing petroleum from mineral surfaces. This released petroleum then either floats on the water surface, or adheres to Teflon surfaces that are part of the test equipment. The NOP reduces the viscosity of the bitumen, the density of the bitumen, and the wetting of mineral surfaces by bitumen. It has both solvent and surfactant properties.

In use, a hydrocarbon recovery composition as described herein may be applied in several means in a field application. Such application will depend upon the configuration of the surface equipment use.

In one example, wherein the hydrocarbon recovery composition comprises NOP, the NOP is used as a neat liquid. In another example, NOP is blended with co-solvents. In another example, NOP is blended with co-surfactants. Such blending may be done prior to shipping to the well-site, or may be done at the well-site, depending on what facilities are available.

In one example, the hydrocarbon recovery composition NOP is applied to steam at or around 305° C., in which case it would be transported into the well as a gas, until a pressure is reached when it (and water) condenses. The liquid chemical may be metered into the pipeline carrying steam which is to be injected, somewhere between the boiler outlet and the wellhead.

In another example, the hydrocarbon recovery composition comprising NOP is added in the liquid phase in wet steam (steam quality is less than 100%). In this case, surface liquid removal equipment is by-passed so the liquid water plus additive enters the well.

In another example, the hydrocarbon recovery composition comprising NOP is added neat or in combination with other liquids as a liquid slug between injections of high quality steam.

In another example, the hydrocarbon recovery composition comprising NOP or mixtures is added in a treat string (tubing inserted down the injection well. Treat strings are often used in oil wells to add oilfield chemicals such as corrosion and scale inhibitors).

Once in the formation, the NOP will distribute between the liquid water, steam and petroleum phases. It is an important aspect of NOP that it can be carried along with other gases into the oil-bearing formation along tiny cracks and fissures that may not be accessible to liquid. Herein it was shown that NOP was as about as effective in the gas phase as the liquid phase in releasing bitumen from ore suspended above the water line.

Further, because the temperatures and pressures in oil reservoirs do vary depending on the oil recovery operation, and the particular point in the production history of the well, it would be desirable to adjust the physical properties of the volatile surfactant. The various homologues of NOP have different boiling points, water miscibilities, oil misciblities and surface active properties depending on their molecular weight and chemical structures. This means that compounds can be selected and formulated to suit any particular condition likely to be encountered in a formation undergoing oil extraction.

For example, early in the life of a well, a higher boiling point homologue might be used to take advantage of the higher temperatures at the initial oil/water interface. Later in the history of the well, when the volume of the swept zone is much higher, and the temperatures in the formation are lower, a lower boiling point homolog might be used so that it can be carried further into the formation via the gas phase, thus helping to increase the ultimate volume of the swept zone.

Because of the modest volatility of NOP and similar compounds, they are less likely to disappear into formations compared to compounds with lower boiling points (methane, propane, carbon dioxide, ammonia, etc.).

Further, because the NOP tends to partition into the oil phase, NOP may be extracted from the produced oil and recycled. The recovery of NOP from produced oil may be carried out in the in the field, or at the refinery.

Further it was found that asphaltenes dissolve in NOP, or NCHP or NDDP. This is in contrast to conventional solvents such as methane, propane, butane and carbon dioxide which precipitate asphaltenes from petroleum at high solvent to petroleum ratios. These precipitated asphaltenes can reduce the permeability in the formation, or foul surface equipment.

Further NOP and related pyrrolidones are easily analyzed in produced water by methods such as gas chromatography or high performance liquid chromatography. They can also be analyzed in bitumen by gas chromatography. This provides a means for oil field operators to calculate a mass balances on these surfactants. This is an advantage over some other conventional surfactants which are difficult to detect and measure in oil field produced fluids.

Methods of the invention are conveniently practiced by providing the compounds and/or compositions used in such method in the form of a kit. Such a kit preferably contains the composition. Such a kit preferably contains instructions for the use thereof.

To gain a better understanding of the invention described herein, the following examples are set forth. It should be understood that these example are for illustrative purposes only. Therefore, they should not limit the scope of this invention in any way.

EXAMPLES

Example 1 As-Is Bitumen in Carbonate Sand

Experiments were carried out with bitumen carbonate oil sand derived from drill core. Samples of ore of approximately 10 g were added to 60 mL synthetic brine containing various concentrations of surfactants (as indicated). The bitumen ore contained about 10 wt % bitumen. Autoclaves were then put into an oven at various temperatures for one week. Various other test compounds are listed for comparison. A summary is presented in Table 1.

TABLE 1

Conditions of Autoclave Tests and % Recoveries of Original Oil in Place

| TYPE | TEMP, C. | PHASE | CONC, % | DISCRIPTION | EXPLANATION | % RECOVERY |
|---|---|---|---|---|---|---|
| Brine | 200 | | N/A | | | 0 |
| Inorganic | 200 | liquid | 1 | waterglass (sodium silicate solution) | react to form Ca/Mg silicates | 0 |
| Reagent | 200 | l | 1 | N-acetylmorpholine | hydrolyzes to form acetic acid | 0 |
| | 200 | l | 1 | triethylacetylcitrate | hydrolyzes to form acetic + citric acid | 1 |
| Surfactant | 150 | gas | 1 | NOP (N-octyl-2-pyrrolidone) | volatile surfactant candidate | 11 |
| | 150 | l | 1 | NOP (N-octyl-2-pyrrolidone) | | 26 |
| | 150 | l | 0.5 | NOP (N-octyl-2-pyrrolidone) | | 12 |
| | 150 | l | 0.1 | NOP (N-octyl-2-pyrrolidone) | | 0 |
| | 200 | l | 1 | alkyl PO-EO-sulfate | "extended" surfactant | 12 |
| | 200 | l | 1 | N-butylethanolamine | volatile surfactant candidate | 1 |
| | 200 | g | 1 | N,N-dibutylethanolamine | volatile surfactant candidate | 0.7 |
| | 200 | l | 0.1 | Ethoduomeen T/25 (15 EO groups per molecule) | oilfield chemical | 0.8 |
| | 200 | l | 0.1 | Ethomeen T/25 (15 EO groups per molecule) | oilfield chemical | 0.7 |
| | 200 | l | 1 | Commercial Blend | proprietary blend of surfactants | 0 |
| | 200 | g | 1 | NOP (N-octyl-2-pyrrolidone) | | 54 |
| | 200 | g | 0.5 | NOP (N-octyl-2-pyrrolidone) | | 3.3 |
| | 200 | g | 0.1 | NOP (N-octyl-2-pyrrolidone) | | 1.3 |
| | 200 | l | 0.1 | NOP (N-octyl-2-pyrrolidone) | | 0.7 |
| | 200 | l | 0.25 | NOP (N-octyl-2-pyrrolidone) | | 1.8 |
| | 200 | l | 0.5 | NOP (N-octyl-2-pyrrolidone) | | 7.7 |
| | 200 | l | 0.75 | NOP (N-octyl-2-pyrrolidone) | | 11 |
| | 200 | l | 1 | NOP (N-octyl-2-pyrrolidone) | | 13 |
| | 200 | l | 1 | EO-PO-EO type | important class of non-ionic surfactant | 7.5 |
| | 243 | g | 0.5 | NOP (N-octyl-2-pyrrolidone) | | 8 |
| | 243 | g | 0.1 | NOP (N-octyl-2-pyrrolidone) | | |
| | 243 | l | 0.5 | NOP (N-octyl-2-pyrrolidone) | | 12 |
| | 243 | l | 0.1 | NOP (N-octyl-2-pyrrolidone) | | 3 |
| Mixture | 200 | l | 1 | alcohol ethoxylate + EGMBE (1:1) | important class of surfactant | 2 |
| | 200 | l | 1 | Ethoduomeen T/25 + H3PO4 (1:5) | dissolve, armor and cement | 5 |
| | 200 | l | 1 | Ethoduomeen T/25 + H3PO4 (3:3)) | dissolve, armor and cement | 6 |
| | 200 | l | 1 | Ethoduomeen T/25 + H3PO4 (5:1) | dissolve, armor and cement | 13 |
| | 200 | l | 1 | Ethoduomeen T/25 + NPE-phosphate ester (1:1) | cationic + anionic blend | 5.6 |
| | 200 | l | 1 | Ethoduomeen T/25 + waterglass (1:1) | replaces carbonates with silicates | 10 |

Figure 2:
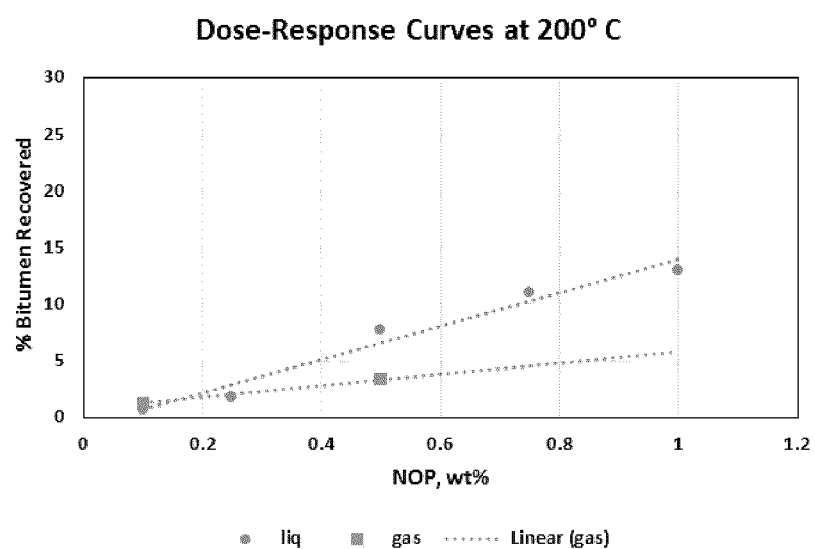
FIG. 2 depicts dose response curves of NOP at 200° C.
Figure 3:
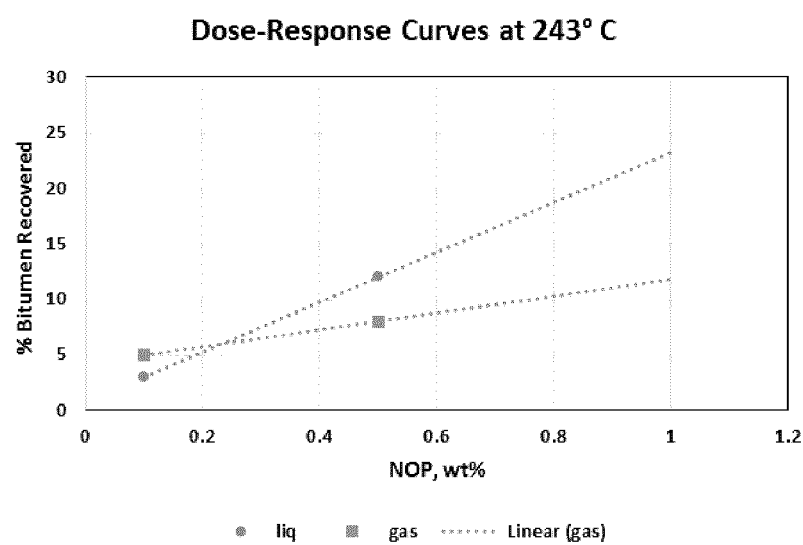
FIG. 3 depicts dose response curves of NOP at 243° C.

A summary of the data is present as dose-respond curves in FIGS. 1, 2 and 3. Bitumen was recovered whether the oil sand was above or below the water line.

Figure 4:
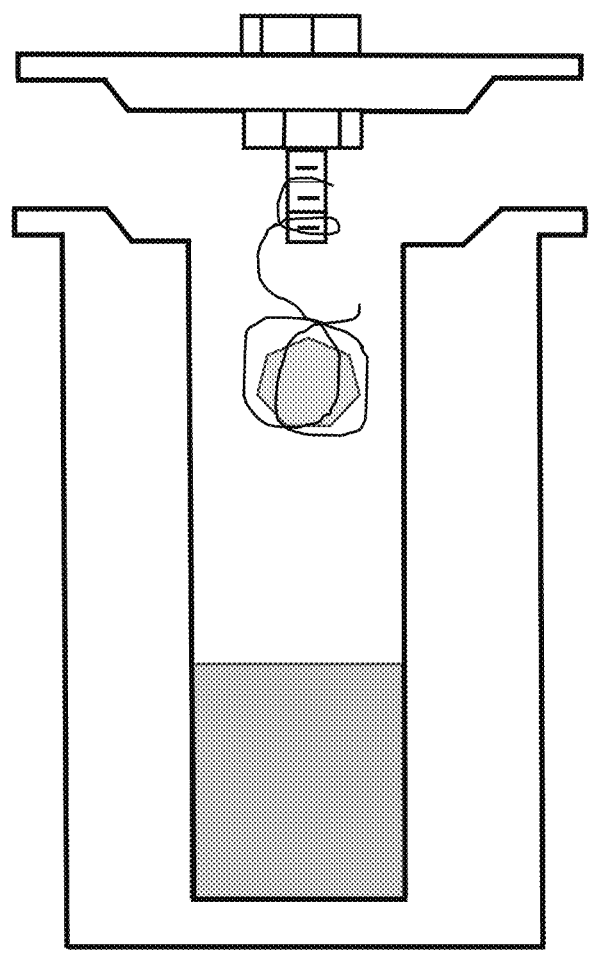
FIG. 4 is a photograph depicting an autoclave liner and lid with sample suspended in wire cage.

FIG. 4 shows part of the autoclave apparatus, along with a sample of the bitumen ore suspended above the water line.

Typically the samples of ore remained intact after the autoclave tests. This ensures that there is no ambiguity about the location of the ore during the test.

Example 2—Pellets Made from Heavy Oil and Crushed Carbonate Core, Tested at 84° C.

The purpose of these tests was to (1) conduct imbibition tests with pellets provide at 84° C.; (2) compare the behaviors of pellets aged cold, and aged at 65° C.; and (3) test three surfactant formulations.

Tests were carried out in 20 mL glass vials with 50% synthetic brine and 1% surfactant formulation.

Ethoduomeen T/25 and Ethomeen 18/25 are both alkylamine ethoxylates from Akzo-Nobel.

NOP was from Aldrich.

Octadecylamine was from Akzo-Nobel, and is used as a corrosion inhibitor, among other things, in oilfield and boiler applications.

Naphthenic acid is from Acros. It is a by-product of petroleum refining and is used in various applications such as paint manufacture.

Linear dodecylbenzene sulfonic acid, Na salt from Stepan was selected because its chemistry is well-defined, and provides a connection to the historical oil-recovery literature.

The formulations of alkylamine ethoxylate plus NOP had significant effects on the pellets.

In these tests the pellets started crumbling after only 1 hour in the oven. After two (2) days in the oven, and after shaking and settling, tiny black droplets were seen at or near the surface of the brine. The other test samples showed no such droplets. After 6 days in the oven, enough oil was released that it could be weighed. Pellets aged at 65° C. released less oil than their respective low-temperature counterparts.

Method and Results:

Tests were carried out in 20 mL glass vials with screw caps. The surfactant formulations were added at 1 wt % to synthetic brine (Table 2).

TABLE 2

Explanation of the Ten Tests

| Test # | Pellet Type | Formulation | Explanation |
|---|---|---|---|
| 1 | Hot | Ethoduomeen T/25 + NOP | Tallowamine-N-propylamine, ethoxylated + NOP |
| 6 | Cold | Ethoduomeen T/25 + NOP | 3 hydrophilic EO chains |
| 2 | Hot | ODAN | Octadecylamine + naphthenic acids in EGMBE |
| 7 | Cold | ODAN | Hydrophobic surfactant mixture |
| 3 | Hot | Ethomeen 18/25 + NOP | Tallowamine ethoxylate + NOP |
| 8 | Cold | Ethomeen 18/25 + NOP | 2 hydrophilic EO chains |
| 4 | Hot | Synthetic brine | Control |
| 9 | Cold | Synthetic brine | |
| 5 | Hot | alkylbenzenesulfonate | Linear dodecylbenzenesulfonic acid, Na salt |
| 10 | Cold | alkylbenzenesulfonate | Traditional Oilfield Surfactant |

For tests 1 and 6, Ethoduomeen and NOP were mixed in a weight ratio of 1:1. For tests 2 and 7, octadecylamine and naphthenic acids (ODAN) were mixed in a weight ratio of 1:1 and dissolved in ethylene glycol monobutyl ether (EGMBE) to give a total concentration of 20 wt %. For tests 3 and 8 Ethomeen and NOP were mixed in a weight ratio of 1:1. Tests 4 and 9 were controls using only 50% synthetic brine. For tests 5 and 10, linear alkylbenezene sulfonate was added at 1 wt %. The initial weights of the pellets are shown in Table 3 and Table 4. The mass ratio of heavy oil to crushed carbonate core was 1:10.

TABLE 3

Masses of Pellet and Oil Released After Each Test, (2 Days).

| Test # | Formulation | Initial Mass of Pellet, g | Oil recovered, g | Pellet Integrity |
|---|---|---|---|---|
| 1 | Ethoduomeen + NOP | 4.03 | Trace | Crumbled |
| 6 | | 4.11 | Trace | Crumbled |
| 2 | ODAN | 3.97 | 0 | Intact |
| 7 | | 3.95 | 0 | Intact |
| 3 | Ethomeen + NOP | 3.83 | Trace | Crumbled |
| 8 | | 3.90 | Trace | Crumbled |
| 4 | Synthetic Brine | 4.02 | 0 | Intact |
| 9 | | 3.96 | 0 | Intact |
| 5 | Alkylbenzene sulfonate | 4.03 | 0 | Intact |
| 10 | | 3.91 | 0 | Intact |

TABLE 4

Masses of Pellet and Oil Released After Each Test, (6 Days).

| Test # | Formulation | Initial Mass of Pellet, g | Oil recovered, g | Wt % oil recovered |
|---|---|---|---|---|
| 1 | Ethoduomeen + NOP | 4.03 | 0.0063 | 1.5 |
| 6 | Ethoduomeen + NOP | 4.11 | 0.0182 | 4.4 |
| 2 | ODAN | 3.97 | 0 | 0 |
| 7 | " | 3.95 | 0 | 0 |
| 3 | Ethomeen + NOP | 3.83 | 0.0120 | 3.1 |
| 8 | " | 3.90 | 0.1170 | 30 |
| 4 | Synthetic Brine | 4.02 | 0 | 0 |
| 9 | " | 3.96 | 0 | 0 |
| 5 | alkylbenzene sulfonate | 4.03 | 0 | 0 |
| 10 | alkylbenzene sulfonate | 3.91 | 0 | 0 |

The vials were place in an oven set to 80° C. (measured T=84° C.). The samples were visually described after 1 hour. The samples were removed after 2 days, described and photographed. After the first set of photos was taken, the vials were briefly shaken and re-photographed. This was to check the mechanical integrity of the pellets, to determine whether any free oil was released and to check for residual surfactant activity, in the form of foam. The photos are arranged in order of increasing visual changes. After photographing the vials, they were returned to the oven. After 6 days, the vials were removed from the oven and photographed. Samples containing free black oil had their oil removed using pre-weighed, plastic, disposable dropping pipets. Any water caught up in the pipet was displaced. This was possible because the petroleum adheres strongly to the polyethylene pipets.

Figure 5A:
FIG. 5(a) is a photograph depicting tests 4 and 9, 50% synthetic brine control; (b) is a photograph depicting tests 2 and 4, after shaking; (c) is a photograph depicting results after 6 days.
Figure 5B:
Figure 6A:
FIG. 6(a) is a photograph depicting tests 2 and 7, with ODAN, the insoluble surfactant mixture is visible as a light amber oil at the surface of the brine; (b) is a photograph depicting tests 2 and 7, after shaking; (c) is a photograph depicting that after six days, a small amount of light amber oil is visible at the water surface.
Figure 6B:
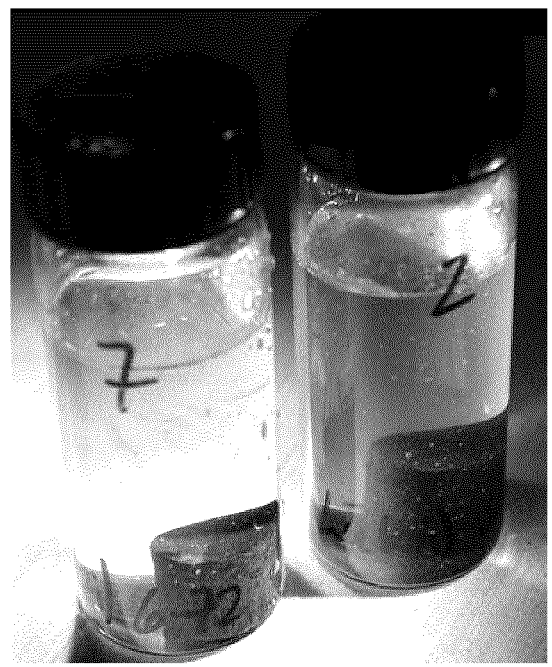
Figure 7A:
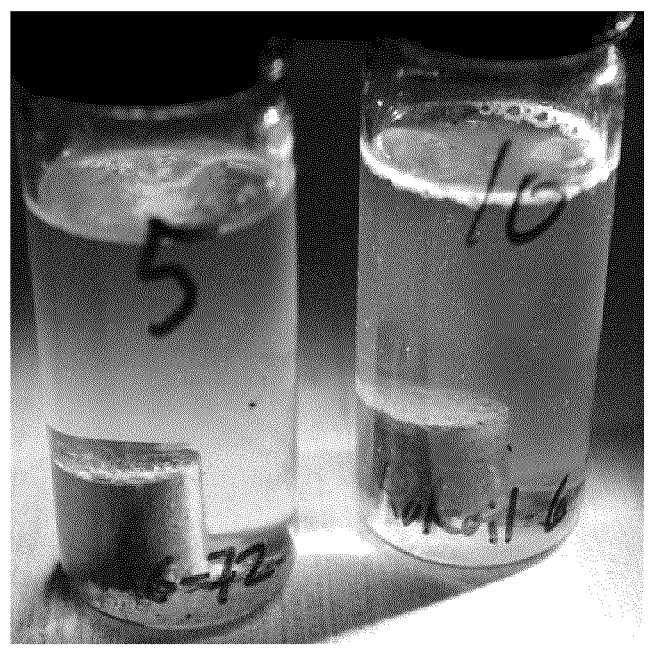
FIG. 7(a) is a photograph depicting tests 5 and 10, with alkylbenzenesulfonate-sodium salt; (b) is a photograph depicting tests 5 and 10, with alkylbenzenesulfonate-sodium salt, after shaking; (c) is a photograph depicting that after 6 days, a pale sludge is present at the water surface.
Figure 7B:
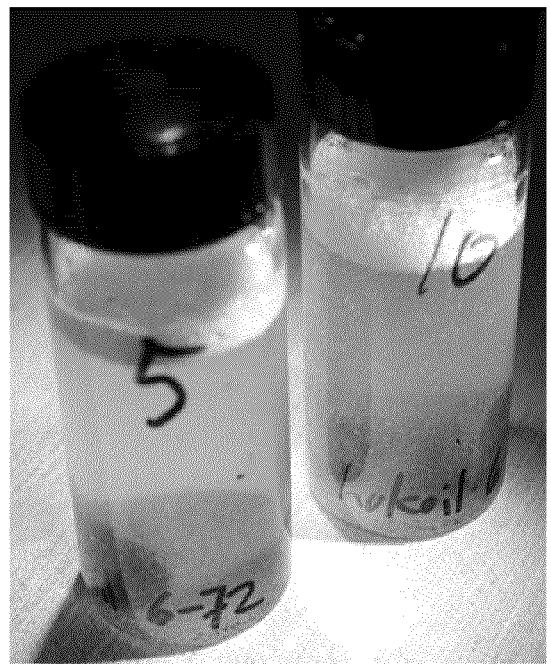
Figure 8A:
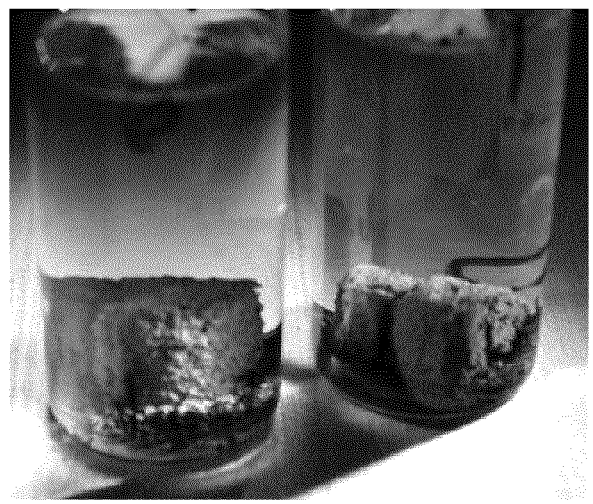
FIG. 8(a) is a photograph depicting tests 1 and 6, Ethoduomeen+NOP (2 days); (b) is a photograph depicting tests 1 and 6, after shaking, three black specks are visible in the foam in vial #1; (c) is a photograph depicting that after 6 days more heavy oil was released (black droplets)
Figure 8B:
Figure 9A:
FIG. 9(a) is a photograph depicting tests 3 and 8, with Ethomeen+NOP; (b) is a photograph depicting tests 3 and 8, after shaking, a black speck is visible in the foam in vial #8; (c) is a photograph depicting that after 6 days the droplets of heavy oil are noticeably larger in both cases.
Figure 9B:

FIG. 5a and FIG. 5b show that the pellets remain intact after heating, and after shaking. The color of the pellets has gone from black to light grey. This may be due in part to surface oxidation during the tests. FIG. 6a and FIG. 6b show that the ODAN formulation had little effect on the pellets. FIG. 7a and FIG. 7b show a small amount of white precipitate. This precipitate formed immediately upon adding the surfactant to the brine. There was little change to the pellets. However, the surfactant did show residual activity in the form of foam formation. FIG. 8a and FIG. 8b show that the pellets treated with Ethoduomeen and NOP had started to crumble, and completely disintegrated upon shaking. The pellets were observed to start breaking up after only 1 hour in the oven. However, a few free droplets of black oil were visible to the naked eye. FIG. 9a and FIG. 9b show that the pellets treated with Ethomeen and NOP displayed similar behaviors to those treated with Ethoduomeen+NOP. Again, only a few free droplets of black oil was visible.

Figure 5C:
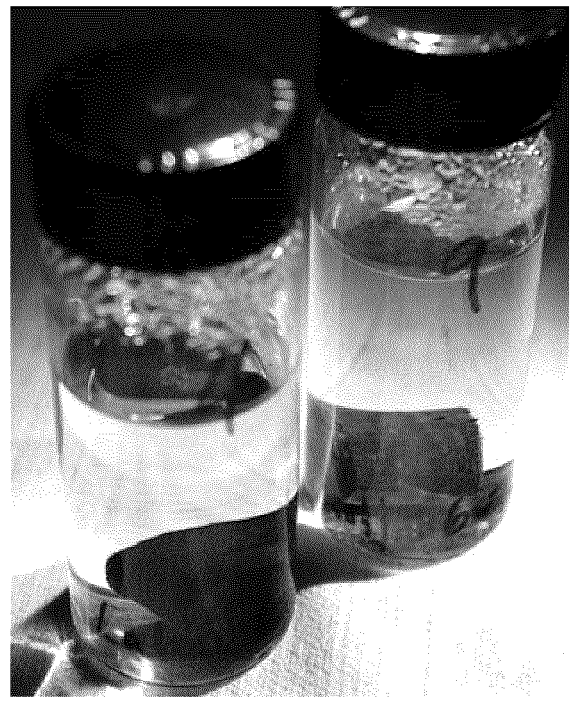
Figure 6C:
Figure 7C:
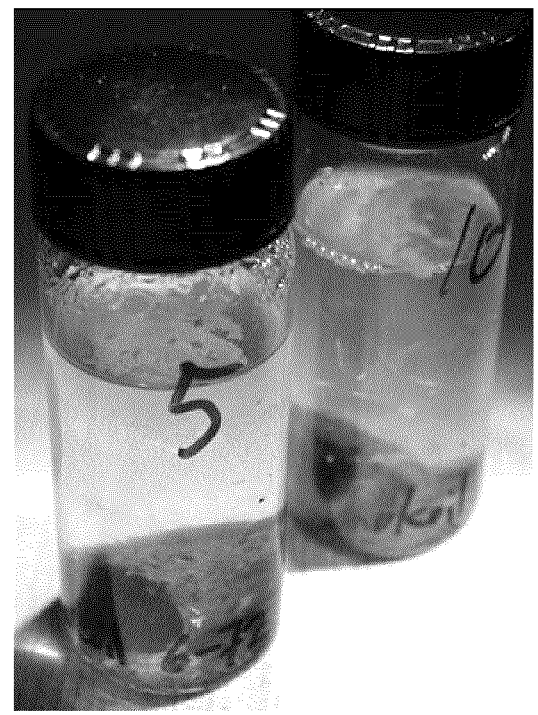
Figure 8C:
Figure 9C:

After six days, the amount of free heavy oil released by the Ethoduomeen blend has visibly increased (FIG. 8c). The amount released by the Ethomeen blend is even greater (FIG. 9c). In both cases the pellet aged at 65° C. released less oil than that which had been aged cold. The weights of recovered heavy oil are given in Table 3. At this time, the amount of surfactant that dissolved in the petroleum (and thus contributed to its weight) has not been determined. FIGS. 5c, 6c and 7c did not show any significant changes.

Note that the insoluble components of ODAN or alkylbenzenesulfonate were not recovered for weighing. In both cases these "oils" were light-colored, and obviously not petroleum.

Example 3—Pellets Made from Heavy Oil and Crushed Carbonate Core, Tested at 200° C.

The purpose of this test was to (1) analyze recently prepared pellets made from carbonate crushed core and old heavy oil, (2) compare two aging methods, (3) compare two surfactants for their ability to release free bitumen.

Half the pellets prepared were aged for 2 weeks at 65° C. in air, and then stored in a refrigerator. The other half were simply stored in the refrigerator.

Ethoduomeen produced more emulsion from the hot-aged pellet than from the cold-aged pellet.

NOP produced significantly more free petroleum from the cold-aged pellet than from the hot-aged pellet.

It was found that NOP released more oil than did Ethoduomeen, for both types of pellet.

Conclusions:

Hot aging of pellets made from old petroleum and crushed carbonate core had a significant impact on the release of petroleum with two different surfactants. Hot aging does reduce the amount of free oil that is released. During the aging procedures, no water was deliberately added. It is expected that some water still exists contained within the petroleum and some moisture exists on the surfaces of the carbonate particles, since both were in equilibrium with ambient air. In these tests NOP released considerably more free petroleum than did the Ethoduomeen, for both types of aged pellet.

Method And Results:

Pellets were prepared by mixing crushed core with heavy oil. This sample of oil was more than 2 years old. A ratio of 10 parts crushed core to 1 part oil was used. Pellets were prepared in a hydraulic press. The resulting pellets are strong: they can be dropped from a 30 cm height on to a hard surface without breaking. The pellets are also dry to the touch. When initially prepared they were stored in a freezer at −18° C. until needed.

Two ageing methods were tested. About 25 pellets were stored in air, in a plastic bag, in a refrigerator (cold-aged). About 25 pellets were aged in air, in glass flasks in an oven at 65° C. for two weeks. After removal from the oven they were stored in a refrigerator (hot aged).

Four pellets were selected for testing in the first autoclave run. Their masses are given in Table 5. Synthetic brine was used, as was the case for the previous autoclave tests with re-saturated core plugs. 0.3 g of Ethoduomeen T/25 were mixed with 59.7 g of brine using a stirrer. NOP is not fully miscible with water, so 0.3 g of NOP was added to 59.7 g of brine in the respective Teflon liners. Pellets were added to the Teflon liners, and the autoclaves were sealed. They were placed in an oven set to 200° C. for 6 days.

Figure 10:
FIG. 10 is a photograph depicting the appearance of brine after decanting from autoclaves, samples 3 and 4 were clear and colorless, suggesting little or no emulsification; essentially all the free petroleum was retained on the walls of the Teflon liner, a few tiny droplets of petroleum are visible at the air/water/glass interface in beaker #3.
Figure 11:
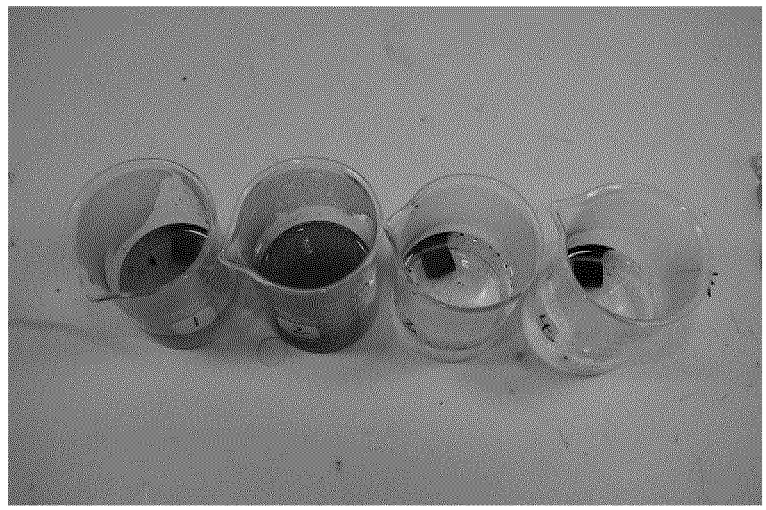
FIG. 11 is a photograph depicting the appearance of brine with a focus on the pellets following the autoclave test, the pellets were recovered whole in all four tests.
Figure 12:
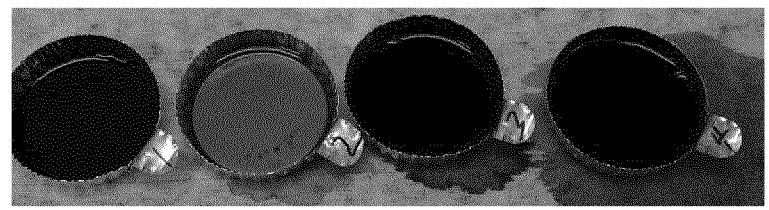
FIG. 12 is a photograph depicting the appearance of methylene chloride extracts of Teflon liners, Ethoduomeen extracted very little petroleum from the Teflon liner containing a hot-aged pellet (#2)
Figure 13:
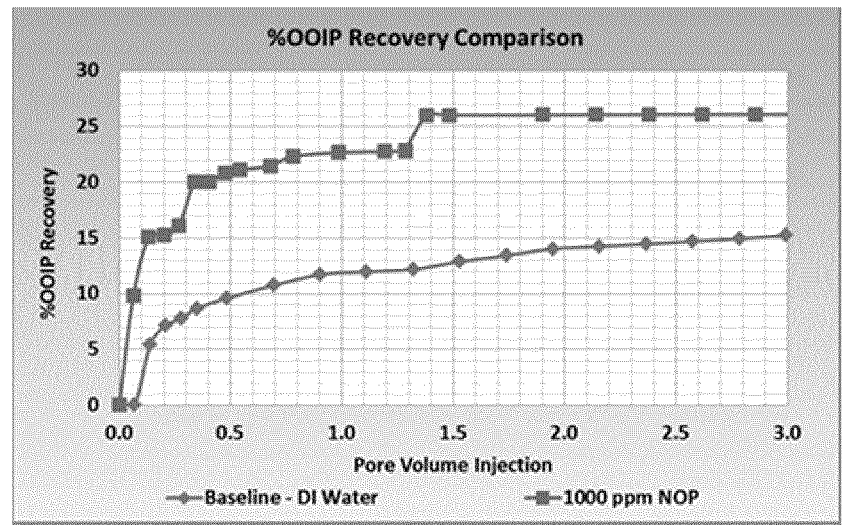
FIG. 13 is graph depicting oil recovery curves from small vertical coreflood tests on Athabasca oil sand using hot water.

After removing the autoclaves from the oven, they were allowed to cool by ambient air and opened for examination. The brine and core plugs were decanted into beakers (FIG. 10 and FIG. 11), leaving the free oil adhering to the walls of the Teflon liners. The Teflon liners were extracted with methylene chloride, and the extracts were transferred to aluminum weighing boats (FIG. 12). The solvent was evaporated at room temperature in a fume hood. The masses of the residues are given in Table 1.

TABLE 5

List of Tests and Results

| Test # | Surfactant | Aging | Mass of Pellet, g | Mass of oil removed, g |
|---|---|---|---|---|
| 1 | Ethoduomeen | Cold | 3.84 | 0.02 |
| 2 | Ethoduomeen | Hot | 3.89 | 0.03 |
| 3 | NOP | Cold | 3.91 | 0.16 |
| 4 | NOP | Hot | 3.99 | 0.09 |

Table 5 shows that NOP released more oil than did Ethoduomeen in this test. FIG. 12 shows that in the case of test #2, methylene chloride did not extract much oil from the Teflon liner. The residue in the aluminum weigh boat is due to something else.

Ethoduomeen was able to emulsify some petroleum. A denser emulsion was obtained from the aged core. Some free petroleum was observed on Teflon liners #1, but none was seen on liner #2.

Some of the mass of residue in tests 3 and 4 is likely due to NOP, which has a boiling point of 305° C. However, the dark color of the methylene chloride extracts, and the final residues, indicates a high proportion of petroleum is present. Further, pellets #3 and 4 were also significantly lighter in color following the autoclave tests.

Example 4

In this example mechanically homogenized, mined Athabasca oil sand was packed into 823 mL copper sleeves and fitted with end caps. This core was placed in an overburden pressure vessel utilizing water as the heat and pressure transfer medium. The apparatus was pressurized to 5330 kPag with pumps and heated to 240° C. with band heaters. Deionized water, without additive or with 1000 ppm NOP or with N-cyclohexyl-2-pyrrolidone (NCHP) or with N-methyl-2-pyrrolidone (NMP), was pumped through the oil sand core at 4000 kPag. Produced liquids were collected in 100 mL vials to allow the quantities of water and bitumen to be measured as functions of the pore volumes injected. One pore volume is equal to about 270 mL. The produced water showed very little emulsified bitumen. The results for the two cases are shown in FIG. 20 and Table 6. The addition of any of the three pyrrolidone derivatives resulted in increased production of bitumen (% oil originally in place) compared with hot water alone. In addition the counter-intuitive observation was made that as the water breakthrough time decreased, the ultimate oil recovery increased, when the above-mentioned pyrrolidone derivatives were added to the injected water. This means that pyrrolidones are able to recover additional bitumen even after water breakthrough.

TABLE 6

Yields of Bitumen, % OOIP, From Hot-Water Corefloods

| Test # | Description | Weight of Oil Sand (g) | Calculated Porosity (%) | Yield, % OOIP | B.P. ° C. |
|---|---|---|---|---|---|
| 2 | Vertical 1000 ppm NOP | 1576.71 | 35.6 | 23.9 | 306 |
| 3 | Vertical baseline | 1592.48 | 34.8 | 15.3 | N/A |
| 5 | Vertical 1000 ppm NCHP | 1600.05 | 34.5 | 21.7 | 290 |
| 6 | Vertical 1000 ppm NMP | 1588.44 | 35.0 | 21.0 | 202 |

Example 5

Figure 14:
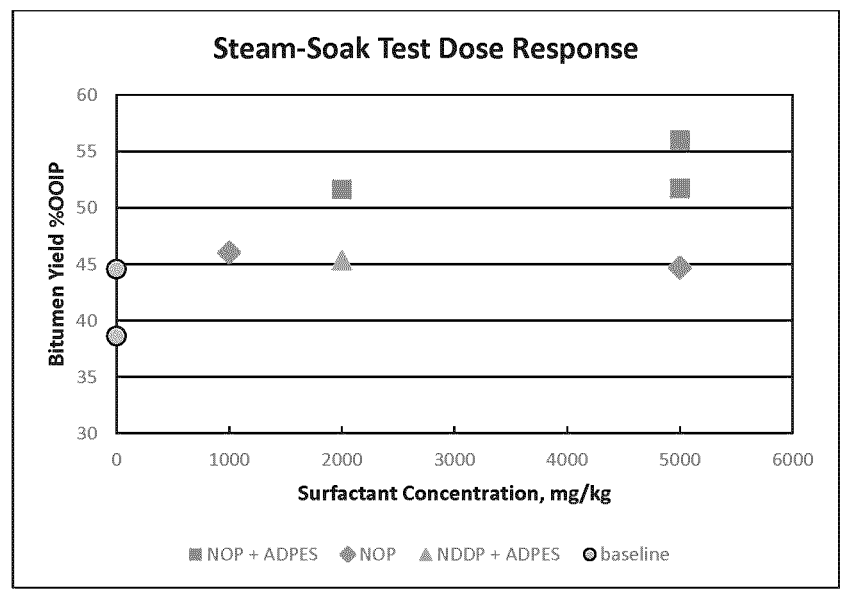
FIG. 14 is a graph depicting the oil recovery from oil sand using chemicals in the gas phase in a steam pressure vessel.

In this example cleaned sand from an oil reservoir was mixed with bitumen and packed into a stainless steel wire mesh basket. This basket was suspended in a pressure vessel above a collection vessel also housed with the pressure vessel. The collection vessel was fitted with a funnel to capture liquid bitumen released by the oil sand during the experiment. Aqueous solution with or without additives was placed inside the pressure vessel, but outside the collection vessel. The vessel was flushed with nitrogen, sealed and heated to 240° C. After one day the vessel was cooled and de-pressurized. The bitumen that had collected in the collection vessel was quantitatively removed and weighed. The results of the various tests are shown in FIG. 14. In some cases, ADPES, or alkyl diphenyl ether sulfonate, sodium salt (also called benzene-1,1'-oxybis-, tetrapropylene derivatives) was mixed with NOP to help keep it dissolved in water. In one experiment N-dodecyl-2-pyrrolidone was added to water along with ADPES. In two tests NOP was added to water alone. The phrase "surfactant concentration" refers to the concentration of each added surfactant. These tests demonstrated that surfactant could be transported via the gas phase to contact the oil sand.

Example 6

In this example quartz sand was packed into a copper sleeve with stainless steel endcaps. This core holder was placed in a pressure vessel containing water as an overburden fluid. The pressure vessel was sealed. The pore volume (PV) of the clean, dry sand was measured. Warm bitumen was injected into the core containing the sand such that the bitumen filled all the pore space. The overburden vessel was pressurized to 4000 kPa to compress the core holder. The entire apparatus was heated using band heaters to 199° C. The pressure inside the core was set to approximately 1400 kPag. At this pressure any water injected into the core would be vaporized. The water was injected from the top of the vertical core and fluids were produced from the bottom using a sample collection system that safely reduces the temperature and pressure of the produced fluids. Samples were collected as functions of both time and the volume of water injected. The produced liquids were separated into water and bitumen phases and their weights were recorded.

This experiment was repeated using different injection solutions, either deionized water or deionized water containing surfactants. The experiments and results are summarized in Table 9. The tests that included surfactant recovered more of the oil originally in place (% OOIP) than the test with water only. More importantly the surfactants were shown to be able to operate in the gas (steam) phase to release bitumen from oil sand.

In test #5 the core was oriented horizontally. In this case between 160 to 300 ppm of NOP were measured in the produced waters. In contrast the concentration of octyl phenol ethoxylate (OPE) was not found in the produced water samples. In other testing it had been found that OPE partly decomposed in water at high temperatures after only a few days. The remainder was presumed to have partitioned into the oil phase. This test highlights the ability of NOP to partition between petroleum and water at elevated temperatures, in contrast to some other surfactants which can be entirely lost to the petroleum phase. This particular test also demonstrated that the recovery of bitumen was not drastically impaired by gravity override or channeling. This is an important goal in the use of surfactants in thermal EOR.

TABLE 7

Results of Steam Coreflood Tests

| Test # | Surfactant | PV (mL) | Volume Bitumen Injected (mL) | % OOIP |
|---|---|---|---|---|
| 1 | Without Additive | 213.9 | 242.12 | 60.86 |
| 2 | 1000 ppm NOP + 540 ppm Ethomeen 18/25 | 215.3 | 243.70 | 66.98 |
| 3 | 1000 ppm NOP + 500 ppm ADPES | 205.8 | 221.23 | 69.29 |
| 4 | 1000 ppm ADPES | 208.8 | 228.71 | 68.91 |
| 5 | 1000 ppm NOP + 1000 ppm OPE (horizontal) | 211.66 | 218.41 | 63.80 |

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A hydrocarbon recovery composition comprising: water; a first N-alkyl-2-pyrrolidone surfactant having a structure of formula (I)

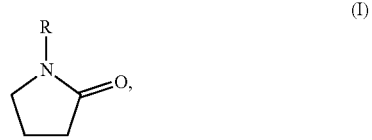

(I)

wherein R is a $C_4$-$C_{30}$ alkyl; and
a second surfactant,
wherein the second surfactant comprises an alkoxylated amine, an Ethomeen, an Ethoduomeen, a Propomeen, or an alkyl aryl sulfonate.

2. The hydrocarbon recovery composition of claim 1, wherein said N-alkyl-2-pyrrolidone is 1-octyl-2-pyrrolidone, N-cyclohexyl-2-pyrrolidone, or N-dodecyl-2-pyrrolidone.

3. The hydrocarbon recovery composition of claim 2, wherein said 1-octyl-2-pyrrolidone, N-cyclohexyl-2-pyrrolidone, or N-dodecyl-2-pyrrolidone is a liquid, a gas, or a solid.

4. The hydrocarbon recovery composition of claim 1, further comprising a co-solvent.

5. The hydrocarbon recovery composition of claim 4, wherein said co-solvent comprises a fluid selected from methane, ethane, propane, butane, other alkanes conventionally used in enhanced oil recovery (EORs), isopropyl alcohol, or 2-butanol.

6. The hydrocarbon recovery composition of claim 1, wherein the ratio of the first N-alkyl-2-pyrrolidone surfactant to the second surfactant is between about 1:99 (wt/wt) to about 99:1 (wt/wt).

7. The hydrocarbon recovery composition of claim 6, wherein the ratio of the first N-alkyl-2-pyrrolidone surfactant to the second surfactant is about 1:1 (wt/wt).

8. The hydrocarbon recovery composition of claim 1, wherein said second surfactant comprises Ethoduomeen T/13, Ethoduomeen T/20, Ethoduomeen T/25; Ethomeen C/12, Ethomeen C/15, Ethomeen C/20, Ethomeen O/12, Ethomeen O/15, Ethomeen T/12, Ethomeen T/15, Ethomeen S/12, Ethomeen S/15, Ethomeen S/20, Ethomeen 18/12, Ethomeen 18/15, Ethomeen 18/20, Ethomeen C/25, Ethomeen T/25, Ethomeen S/25, Ethomeen 18/25, Propomeen C/12, Propomeen O/12, or Propomeen 17/12.

9. The hydrocarbon recovery composition of claim 8, wherein said second surfactant is Ethomeen 18/25, Ethoduomeen T/13, T/20, or T/25.

10. The hydrocarbon recovery composition of claim 9, wherein said second surfactant is Ethoduomeen T/25.

11. The hydrocarbon recovery composition of claim 1, wherein said second surfactant is an alkyl aryl sulfonate.

12. The hydrocarbon recovery composition of claim 11, wherein said alkyl aryl sulfonate is an alkyl diphenyl ether sulfonate (ADPES).

13. A system for recovering a hydrocarbon from a hydrocarbon containing reservoir, comprising:
a) a well system for a heated-fluid method of recovering said hydrocarbons from said hydrocarbon containing reservoir; and
b) the hydrocarbon recovery composition of claim 1.

14. A method of recovering a hydrocarbon from a hydrocarbon containing reservoir, comprising:
a) providing a hydrocarbon recovery composition to a hydrocarbon containing reservoir,
the hydrocarbon recovery composition comprising a first N-alkyl-2-pyrrolidone surfactant having a structure of formula (I)

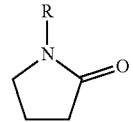

(I)

wherein R is a $C_4$-$C_{30}$ alkyl, and optionally water and a second surfactant,
wherein the second surfactant comprises an alkoxylated amine, an Ethomeen, an Ethoduomeen, a Propomeen, or an alkyl aryl sulfonate;
b) extracting a portion of said hydrocarbons within said hydrocarbon containing reservoir; and
c) removing said extracted portion of said hydrocarbons from said hydrocarbon containing reservoir.

15. The method of claim 14, wherein said providing of said hydrocarbon recovery composition comprises providing said hydrocarbon recovery composition in a recovery process, wherein said hydrocarbon recovery composition is dissolved in a heated fluid.

16. The method of claim 15, wherein said heated fluid is a heated liquid or a heated gas.

17. The method of claim 15, wherein the recovery process comprises cyclic steam stimulation, steam assisted gravity drainage, vapour extraction, steam flooding, or enhanced oil recovery.

18. The method of claim 14, wherein said extracting comprises contacting said hydrocarbon recovery composition with said hydrocarbon containing reservoir for a time sufficient to extract said portion of said hydrocarbons.

19. The method of claim 18, wherein said time sufficient to extract said portion of said hydrocarbon is less than about seven days, is about seven days, or is more than about seven days.

20. The method of claim 14, wherein said removing of said extracted portion of said hydrocarbons comprises pumping said extracted hydrocarbons from said hydrocarbon reservoir.

21. The method of claim 14, further comprising removing said hydrocarbon recovery composition from said removed portion of said extracted hydrocarbons.

22. An injectable liquid comprising a hydrocarbon recovery composition in heated fluid, the hydrocarbon recovery composition comprising water, a first N-alkyl-2-pyrrolidone surfactant having a structure of formula (I)

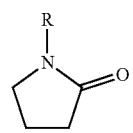

(I)

wherein R is a $C_4$-$C_{30}$ alkyl, and
a second surfactant, wherein the second surfactant comprises an alkoxylated amine, an Ethomeen, an Ethoduomeen, a Propomeen, or an alkyl aryl sulfonate.

* * * * *